(12) United States Patent
Juster et al.

(10) Patent No.: US 6,973,498 B1
(45) Date of Patent: Dec. 6, 2005

(54) LOCAL QUEUE CREATION SECURITY

(75) Inventors: Doron Juster, Haifa (IL); Raphael Renous, Haifa (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/533,468

(22) Filed: Mar. 23, 2000

(51) Int. Cl.[7] ............... G06F 15/16; G06F 15/173; G06F 12/14
(52) U.S. Cl. ............... 709/229; 709/226; 713/201
(58) Field of Search ............... 709/203, 227, 709/234, 226, 229; 395/609; 345/744; 713/166, 713/201, 200

(56) References Cited

U.S. PATENT DOCUMENTS

| | | | |
|---|---|---|---|
| 5,678,041 A * | 10/1997 | Baker et al. | 707/9 |
| 6,070,184 A * | 5/2000 | Blount et al. | 709/200 |
| 6,161,125 A * | 12/2000 | Traversat et al. | 709/203 |
| 6,269,399 B1 * | 7/2001 | Dyson et al. | 709/224 |
| 6,298,386 B1 * | 10/2001 | Vahalia et al. | 709/234 |
| 6,323,881 B1 * | 11/2001 | Broulik et al. | 345/744 |
| 6,425,017 B1 | 7/2002 | Dievendorff et al. | 709/315 |
| 6,446,206 B1 | 9/2002 | Feldbaum | 713/175 |
| 6,490,680 B1 * | 12/2002 | Scheidt et al. | 713/166 |
| 6,529,932 B1 | 3/2003 | Dadiomov et al. | 709/101 |

OTHER PUBLICATIONS

Leppik, Peter, Re: Credit Cards With Internet Fraud Insurance, Jun. 8, 1998.*

"Programming Best Practices with Microsoft Message Queuing Services (MSMQ)," by Charles Sterling, *Microsoft Corporation*, 8 pages (Jun. 1999) http://msdn.microsoft.com/library/default.asp?url=/library/en-us/dnmqqc/html/msmqbest.asp.

"Closing the Holes in MQ Security," *SJG Consulting Ltd.*, (1999) http://www.sjg-enterpriseintegration.com/closingmqholes.asp.

"Middleware: A Model for Distributed System Services," by Philip A. Bernstein, *Communications of the ACM*, vol. 39, No. 2, Feb. 1996, pp. 86-98.

* cited by examiner

*Primary Examiner*—Larry D. Donaghue
(74) *Attorney, Agent, or Firm*—Workman Nydegger

(57) ABSTRACT

Local queue creation security is disclosed. In one embodiment, for a message transaction system being implemented in conjunction with an operating system provide user-level security only, local machine- or local-level security is provided for by a service running on a client. In one embodiment, a method includes sending a first request to create a local queue, by an application of a client from a function of the client to a server. If the server determines that the user under which the application is running has permission to create local queues, the local queue is created. Otherwise, a second request to create the local queue is sent from the function to a service having permission to create local queues. If the service determines that the second request originated locally, then the service calls the server to create the local queue.

16 Claims, 3 Drawing Sheets

LOCAL QUEUE CREATION SECURITY

FIELD OF THE INVENTION

The invention relates generally to message transaction systems, and more particularly to the secure creation of local queues within such systems.

BACKGROUND OF THE INVENTION

When organizations need to have large-scale computer systems that hold mission critical information, such as purchase orders, financial information, etc., they usually resort to message transaction systems. Message transaction systems ensure that data is not lost if the system crashes, and also that data is not duplicated—such as ensuring that two copies of the same purchase order are not processed, etc. A transaction is an activity or a request, such as an order, a purchase, a change, or an addition to a database of information. Transactions usually update one or more files on a non-volatile storage such as a hard disk drive, and thus can serve as both an audit trail and a history for future analyses. A transaction can include one or more messages. A transaction is considered committed when all the messages of the transaction have been received and processed. The messages of a transaction are received at a client at one or more queues of the client.

Frequently, the operating systems in conjunction with which message transaction systems are implemented have security that is user-based. This means that a given user, if he or she has permission to create queues, for example, is able to create queues regardless of the client onto which the user is actually logged. Generally, in such systems, users have default permission to create queues, since the ability for users to create queues on at least their local machines is necessary for applications within the message transaction systems to run properly.

However, this situation can lead to compromised security. Because the security is user-based, and by default the user is able to create queues on any client, a malicious user can swamp a given client by requesting too many to be created queues on the client—thus denying service for legitimate users. The security is thus not local- or local machine-based—because of the underlying operating system on which the message transaction system is running, within the prior art, a given user cannot be limited to creating queues only on the specific client the user is logged onto. Once the user is given permission to create queues, due to the user-based security, the user is able to create queues on any client. For this and other reasons, there is a need for the present invention.

SUMMARY OF THE INVENTION

The invention relates to local queue creation security. In one embodiment, a method includes sending a first request to create a local queue, by an application of a client from a function of the client to a server. If the server determines that the user under which the application is running has permission to create local queues, the local queue is created. Otherwise, a second request to create the local queue is sent from the function of the client to a server having permission to create local queues. If the service determines that the second request originated locally—i.e., within the client itself—then the service calls the server to create the local queue.

Embodiments of the invention provide for local-based security within message transaction systems, even where the underlying operating system has only user-based security. In the method described in the previous paragraph, for example, the user may now have by default no permission to create local queues. Thus, when the function calls the server, the server will deny the request to create a local queue. However, the service running on the client does have user-level security to create queues, but it only allows queues to be created for requests to create queues that originate from within the client. Thus, when the function calls the service, if the service determines that this request to create a queue originated locally, only then does it call the server to create a queue. From the server's perspective, it is still enforcing user-level security, where both the user himself or herself and the service have such security. However, the service only permits queues to be created that are on the same client from which the request originated—thus, the service itself provides for local machine- or local-based security by its enforcement as to what situations in which it will allows queues to be created.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
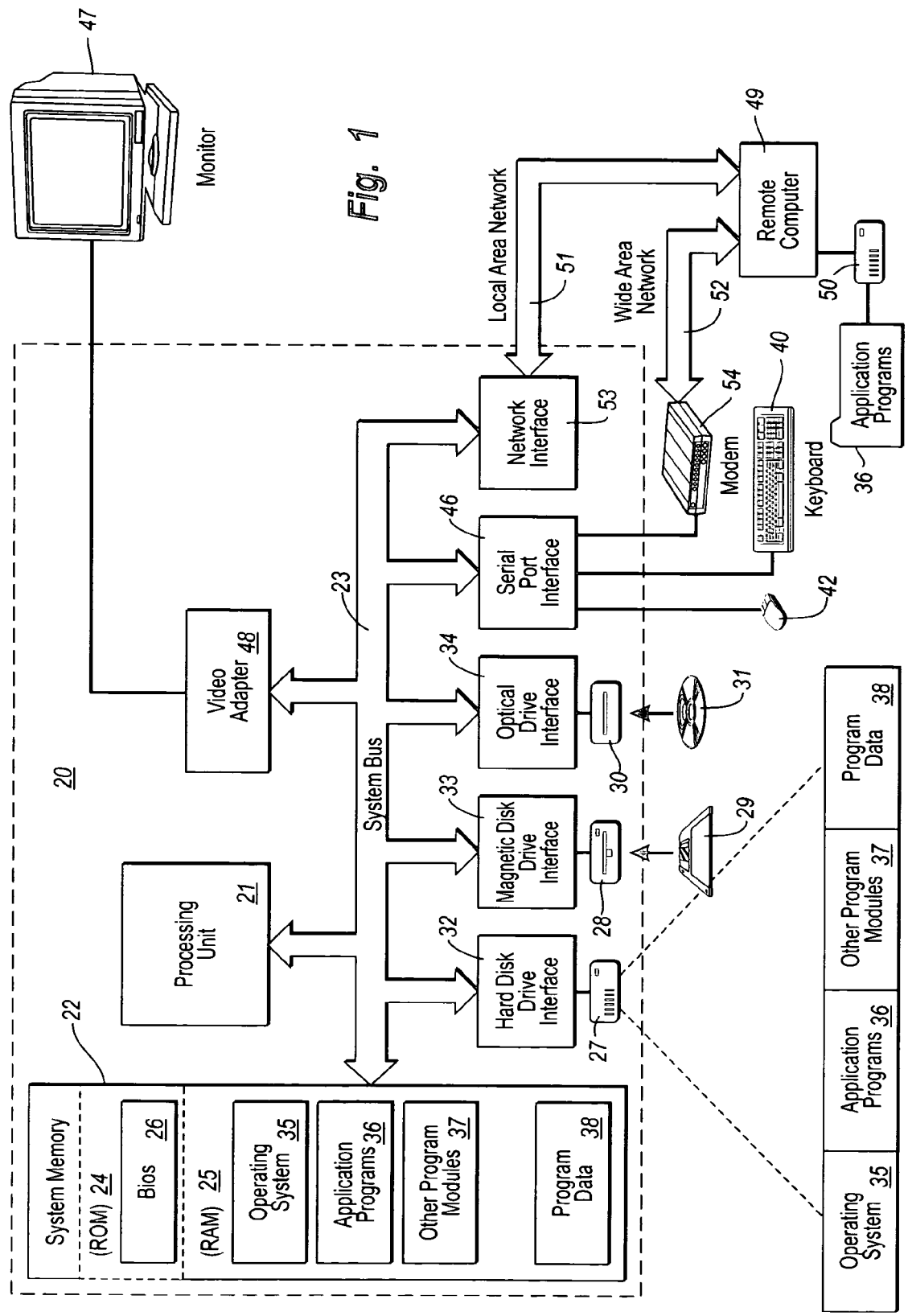
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Systems

Figure 2:
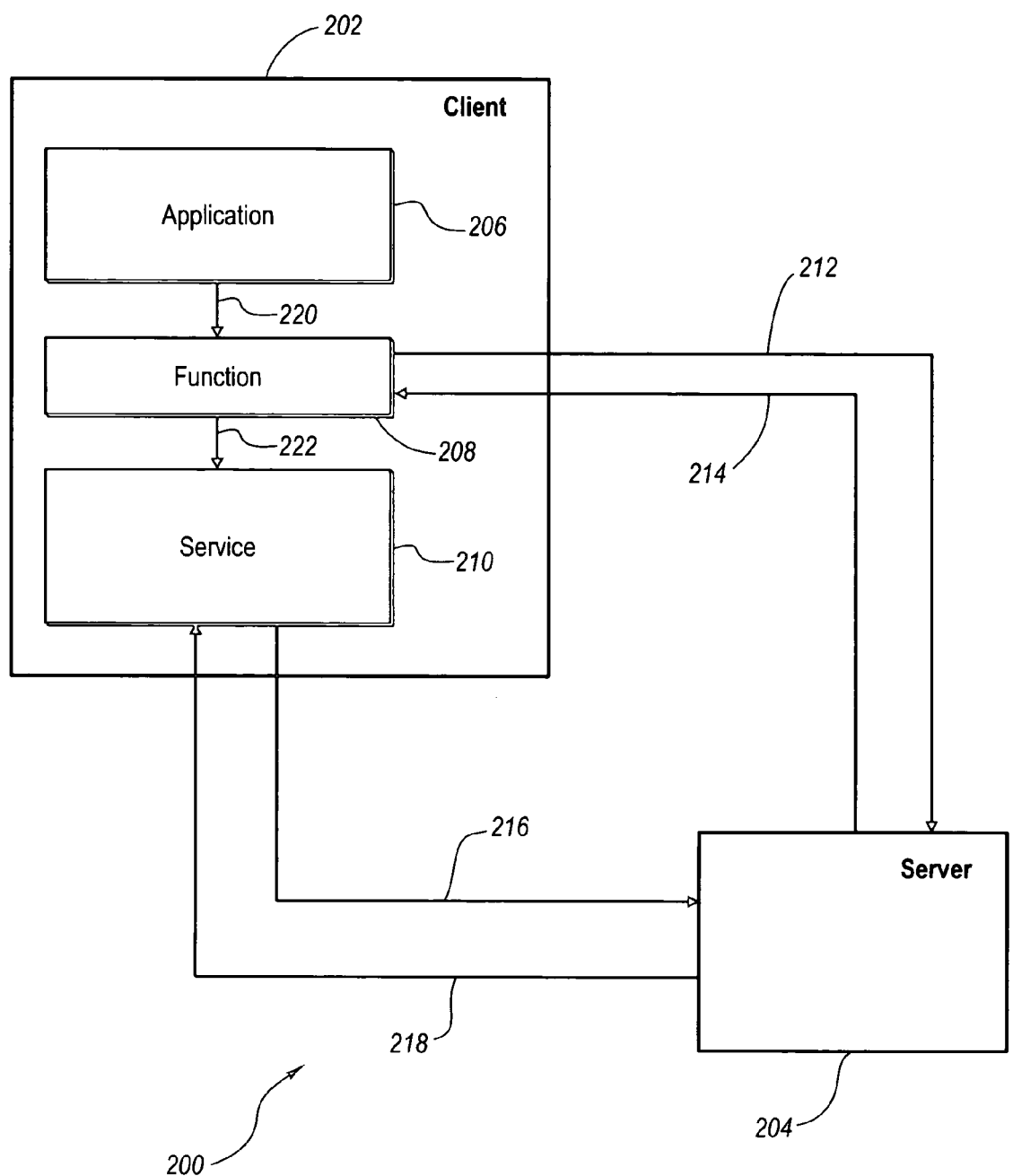
FIG. 2 is a diagram of a system according to an embodiment of the invention; and, FIG. 3 is a flowchart of a method according to an embodiment of the invention.

In this section of the detailed description, systems according to varying embodiments of the invention are described. The systems are described in conjunction with FIG. 2, which is a diagram of a system according to an embodiment of the invention. The system 200 of FIG. 2 includes a client 202 and a server 204. The client 202 communicates with the server 204 over a network not shown in FIG. 2. The network can be any type of public, private, or combination public-private network or networks, such as the Internet, a local-area network (LAN), a wide-area network (WAN), an intranet, an extranet, or combinations thereof, as can be appreciated by those of ordinary skill within the art.

Each of the client 202 and the server 204 in one embodiment is a computer, such as that described in the previous section of the detailed description. Desirably, both the client 202 and the server 204 are part of a message transaction system, which is desirably implemented in conjunction with an operating system that provides for user-level security. User-level security is generally defined as security that is dependent on the identity of a user only, and not on the specific client or machine, for example, that the user is currently logged onto. Within the system 200 of FIG. 2, ordinary users generally have by default no permission to create local queues. Such an ordinary user is logged onto the client 202 in the system 200 as a representative example used throughout this section of the detailed description.

The client 202 includes an application program 206, a function 208, and a service 210. Each of the program 206, the function 208, and the service 212 can in one embodiment be executed by a processor of the client 202 from a computer-readable medium thereof, such as a memory or a hard disk drive, for example. The program 206 is an application program desiring to create a local queue, for use within the message transaction system. That is, in one embodiment, the application program 206 is a message transaction client application program. The application program 206 sends a request 220 to the function 208 to create a local queue on the client 202. It is noted that the program 206 runs under the logged-on user's credentials, such that in the example used in this section of the detailed description, the program 206 does not have rights to create such a local queue. The function 208 in one embodiment is implemented as including an application programming interface (API), as known within the art.

The function 208, upon receiving the request 220, sends a first request 212 to the server 204 to create the local queue. However, because the server determines that the user under which the client 202 is currently running does not have rights to create such a queue (as used in this example), the server sends an indication 214 back to the function 208 that the request has been denied. Therefore, the function 208 forwards the program's request 220 to create a queue to the service 210, as represented as a second request 222 in FIG. 2. The service 210 is considered its own user, having its own user rights and permissions, apart from the user actually logged onto the client 202. In the example, the service 210 has user-level permission to create local queues, on any client machine, not just the client 202. However, the service 210 is such that it only allows queues to be created in response to requests that originated from within the client 202 on which the service 210 is itself running. In this way, the service 210 provides for local-based or local machine-based security.

Thus, the service 210 determines whether the request 220 to create a queue, as has been forwarded to it as represented as the second request 222, has originated from the client 202 on which the service 210 is itself running. Only upon so determining does the service call the server 204, as represented by 216 in FIG. 2, to create a queue on the client 202. It is noted that the server 204 still performs security authentication on the "user" that is the service 210, but since the service 210 does in fact have user-level security to create queues (on any local machine), the service 210 grants the request and creates the queue on the client 202, sending an indicating 218 that the request was granted and the local queue was created.

It is noted that if the service 210 had received a call to create a queue on the client 202 that did not originated from within the client 202, or if the service 210 had received a call to create a queue on any other client regardless of the call's origination, then the service 210 would not allow a queue to be created. In such a situation, the service 210 would not call the server 204 to create a queue—but if it did, the service 210's request to create a queue would be granted, because the service 210 has user-level rights to create queues. Thus, the service 210 itself provides for local-based security such that queues can only be created on the client 202 on which the service 210 is itself running and only in response to requests to create queues that originate from within the client 220, such as from the application program 206. Thus, while the operating system in conjunction with which the message transaction system is implemented may still only provide user-level security, the service 210 nevertheless provides for local-level security.

Methods

In this section of the detailed description, methods according to varying embodiments of the invention are described. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer. The methods can be implemented in conjunction with the system of FIG. 2 described in the previous section of the detailed description, such as in conjunction with the application program, the function, the service, and the server of FIG. 2, although those of ordinary skill within the art can appreciate that the invention itself is not so limited.

Figure 3:
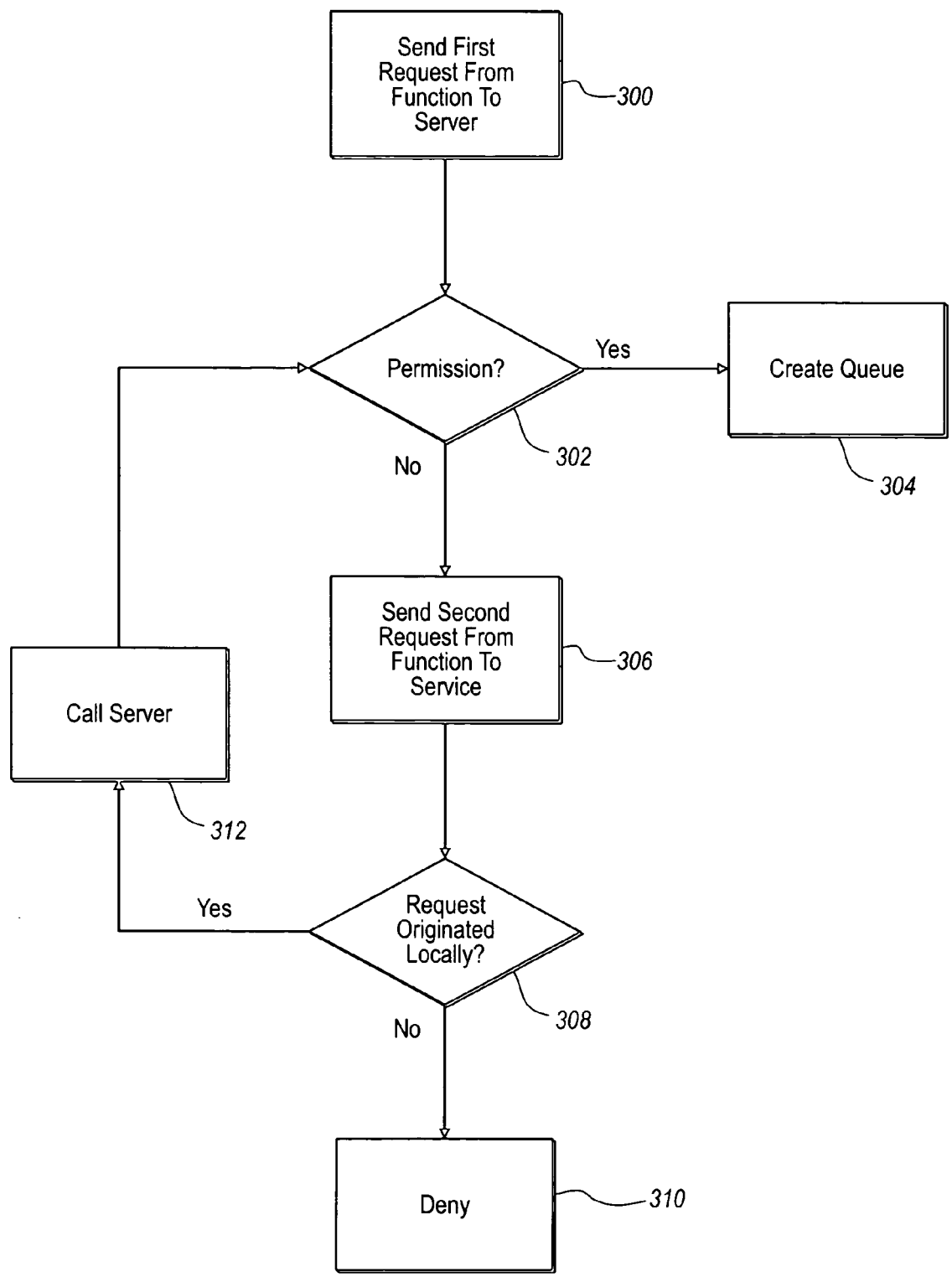

Referring to FIG. 3, a flowchart of a method according to an embodiment of the invention is shown. In 300, a first request is sent to create a local queue from a function of a client to a server. The request originated from an application of the client, which sent the request to the function. The client and the server are desirably part of a message transaction system implemented in conjunction with an operating system that provides only for user-level security.

In 302, the server determines whether the user under which the application is running has permission to create local queues. In one embodiment, the default user rights are such that no such permission is given—that is, users cannot by default create local queues. However, if the user does have permission to create a local queue, then the server creates the queue in 304, and the method is finished. However, more usually, the method instead proceeds to 306, since the user typically does not have permission to create local queues.

In 306, the function has received indication that the request to create a queue was denied, and therefore sends a second request to create the local queue to a service running on the client. The service in one embodiment desirably has user-level rights to create local queues. In 308, the service determines whether the request received originated locally. That is, the service determines whether the request is from within the client on which it is running itself, and whether the request pertains to the creation of a queue on the client. If not, then the request is denied in 310, and the method is finished.

Otherwise, the method proceeds to 312, where the service calls the server to create the queue. It is noted that the method then proceeds back to 302, where the server determines whether the user has user-level permission to create the queue. However, since desirably the service is its own "user," and has user-level permission to create local queues, the server grants the request, and creates the queue in 314, where the method is finished.

Thus, the method described provides for local-level security even on an operating system having only user-level security. Local-level security is generally defined as security dependent on the local machine or client on which a given user is currently logged onto. Thus, a given user logged onto a machine such that an application program on that machine requests a local queue to be created on that machine will be allowed by the service to have such a queue created. If the service instead receives a request to create a queue on a different machine than that on which it is running, or receives a request that originated from a different machine that that on which it is running, the service does not allow such a queue to be created. That is, the service itself provides for local-level security.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method comprising:
    sending a first request to create a local queue by an application of a client from a function of the client to a server;
    upon determining at the server that a user under which the application is running has permission to create local queues, creating the local queue by the server;
    otherwise, sending a second request to create the local queue by the application of the client from the function of the client to a service having permission to create local queues; and
    only upon determining by the service that the second request originated locally, calling the server by the service to create the local queue.

2. The method of claim 1, wherein the server uses only user-level security.

3. The method of claim 1, wherein the service, by calling the server to create the local queue only upon determining that the second request originated locally, provides for local-level security.

4. The method of claim 1, wherein the service comprises a transactional message service.

5. The method of claim 1, wherein the function is accessed by the application via an application programming interface (API) of the function.

6. The method of claim 1, wherein the service is running on the client.

7. The method of claim 1, wherein the user by default lacks permission to create local queues.

8. A machine-readable medium having instructions stored thereon for execution by a client processor to perform a method comprising:
    sending a first request to create a local queue by an application of the client from a function of the client to a server;
    upon receiving indication from the server that the first request was denied, sending a second request to create the local queue by the application of the client from the function of the client to a service having permission to create local queues; and,
    only upon determining by the service that the second request originated locally, calling the server by the service to create the local queue.

9. The medium of claim 8, wherein the server uses only user-level security, and the service, by calling the server to create the local queue only upon determining that the second request originated locally, provides for local-level security.

10. The medium of claim 8, wherein the service comprises a transactional message service, the function is accessed by the application via an application programming interface (API) of the function, and the service is running on the client.

11. The medium of claim 8, wherein the user by default lacks permission to create local queues.

12. A computerized system comprising:
    a server having the capability to create local queues; and,
    a client comprising:
        an application program;
        a function designed to send a first request to create a local queue by the application program to the server and to receive indication from the server as to whether the first request was denied; and
        a service having permission to create local queues and designed to receive a second request to create the local queue by the application from the function, the function sending the second request upon receiving indication from the server that the first request was denied, the service calling the server to create the local queue only upon determining that the second request originated locally.

13. The system of claim 12, wherein the client further comprises a computer-readable medium and a processor, such that at least one of the application program, the function, and the service is executed by the processor from the medium.

14. The system of claim 12, wherein the server uses only user-level security, and the service, by calling the server to create the local queue only upon determining that the second request originated locally, provides for local-level security.

15. The system of claim 12, wherein the service comprises a transactional message service, and the function is accessed by the application via an application programming interface (API) of the function.

16. The system of claim 12, wherein the user by default lacks permission to create local queues.

* * * * *